June 28, 1938. W. E. MINER ET AL 2,122,196
SAW
Filed Sept. 18, 1936
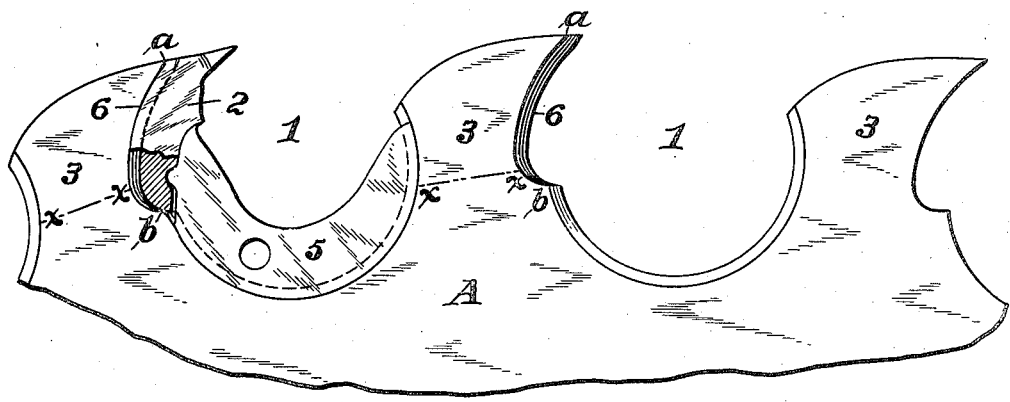
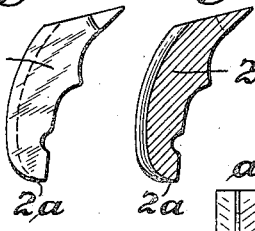
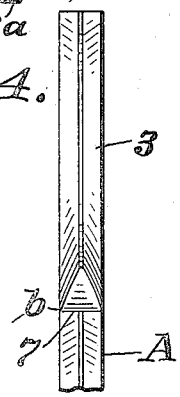
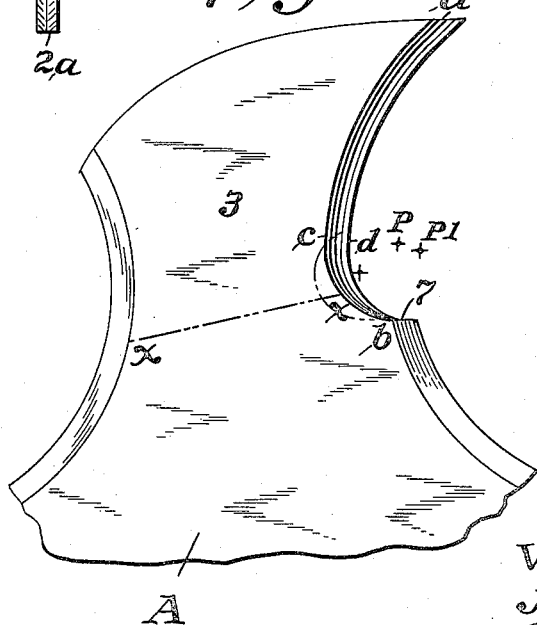
Inventors:
William E. Miner,
James S. Miner,
By Speer, Donnerson & Hall
Attorneys.

Patented June 28, 1938

2,122,196

UNITED STATES PATENT OFFICE 2,122,196

SAW

William Emery Miner, Meridian, Miss., and James Sterlin Miner, Shreveport, La., assignors, by direct and mesne assignments, to Simonds Saw and Steel Co., Worcester County, Mass.

Application September 18, 1936, Serial No. 101,510

2 Claims. (Cl. 143—151)

Of late years, good timber being scarce in certain sections, it has been necessary to use knotty logs in the production of lumber, and it has been found that the saws used are subject to breakage owing to the hammer action of the teeth against the hard knots. One object of our invention is to provide a saw which will stand the extra strain imposed thereon in dealing with hard or knotty logs.

The drawing shows in Figure 1 a side view of a part of a saw blade of rotary type with one of the teeth combined with said blade in accordance with our invention.

Fig. 2 is a view of the tooth according to the present invention.

Fig. 3 is a diagram.

Fig. 4 is an edge view of the saw body looking from the right of Fig. 3.

Fig. 5 is a bottom plan view of the bit.

Fig. 6 is a side view of the bit.

Fig. 7 is a view of the bit in section.

The improvement relates to the formation of the seat in the saw body and the corresponding formation of the inserted tooth at the base thereof where much of the strain or blow is imposed as the tooth strikes the wood being sawed. This strain in knotty timber is sufficient to cause breakage.

In the drawing, A represents a portion of a saw body having recesses 1 in its edge in which the bits or teeth are mounted, one of which is shown at 2. The part of the saw between the recesses may be referred to for convenience as projections 3. The saw tooth at its cutting end is of well known form. The improvement presented by this invention concerns what may be termed the base end of the tooth and the form of the recess in the saw blade which receives this base end.

In ordinary practice the saw blade is formed with a main recess 1 of generally semi-circular form which receives a locking member 5, also of ordinary form, employed for holding the tooth in place in a subsidiary recess 6 of the general form indicated at 6, but improved according to the present invention, as will be presently described. In ordinary practice the lower end of this subsidiary recess 6, or, in other words, the end which is nearest the center of the saw body, is of such form that excessive strains (due, for instance, to the tooth striking hard knots, or the like) will not be resisted, but breakage of the projection 3 will take place, resulting in loss of the saw blade.

The present invention consists in so forming the base portion of the tooth that the wall or edge of the subsidiary recess will, in effect, be built out in relation to its customary shape, so that the base line of the projection 3 will be lengthened from $x$ to $x$, and thus strength will be added to the projection to such an extent as will resist the severe strain and prevent breakage. For this purpose the wall or edge of the subsidiary recess is formed on a continuous curved line from point $a$ to point $b$ without undercutting it at any place between the points mentioned, and furthermore, the V-shaped edge with which it is customary to provide this subsidiary recess is carried down to the bottom of said recess, which bottom portion is indicated at 7. This bottom wall forms a shoulder upon which the bottom face $2a$ of the tooth member 2 bears. The V-shaped edge instead of terminating at a considerable distance above the bottom wall 7, as in ordinary practice, extends with more or less of its altitude practically down to this bottom wall or shoulder, and thus adds strength to the projection substantially along the line $x$—$x$.

Diagram Fig. 3 illustrates the feature of construction relating to the form of this subsidiary recess in comparison with a form which will not accomplish the object sought, the purpose of this diagram being to illustrate the feature of novelty herein and its purpose. In this diagram, the full line from $c$ to $b$ indicates the improved form of the recess and the tooth adapted thereto as compared with the dotted line which shows that in the improvement the metal of the saw body is not undercut, but, on the contrary, it is solid out to the line $d$, and hence adds strength at this point, and furthermore, the root or base portion of the tooth insert being formed to correspond with the line $c$—$b$ will not act as a wedge tending to split the projection in the direction of the line $x$—$x$.

To describe the new construction in other language, it may be said that at the point where the bottom of the subsidiary recess merges with the curve of $b$—$c$ there is no undercut or reentrant recess or angle, but, on the contrary, the metal of the body of the saw fills out this angle and thus strengthens the saw body at this point so that rupture will be prevented.

Furthermore, it will be noticed that the curve of the edge of the subsidiary recess merges into or meets the bottom wall 7 of the recess gradually without an abrupt turn, thus adding to the amount of metal across the base of the projection 3, and adding strength thereto.

In theory, applicants' improvement resides in making the bottom portion of the subsidiary recess and the tooth to correspond along the line c—b, instead of making the recess along the dotted line, Fig. 3, thus adding strength to the saw blade and preventing the tooth from having a wedging action tending to split the projection 3 at its base.

It will be understood that the tooth is formed with a V-shaped groove to fit the V-shaped edge of the subsidiary recess 6. The holding member for the tooth is also formed with a groove along its edge V-shaped in cross section to receive the correspondingly shaped edge of the main recess of the saw body.

In applicants' construction, the substantially right angular shape of the lower corner of subsidiary recess is avoided, and instead the contour of this part of the subsidiary recess is of a gradual concave formation from the rear edge of this recess to the bottom wall thereof, as at c—b. This curve is made on a long radius, the center from which the curve is described being located at or adjacent the points P, P¹ in Fig. 3, to avoid an abrupt turn at this point.

From a practical standpoint, it might be said that the effect of the invention is to add metal to the saw body at its crucial point of weakness, i. e., at the base of its projection, where ordinarily, as shown in the diagram, an undercut is present, see the dotted line, or, in other words, the lower or inner end of the bit has been made narrower, and to an equal extent the quantity or mass of metal in the region of the base of the projection at say $x$ has been increased by making this region of greater width thus adding strength. The curve at the rear lower part of the bit is on a longer radius than usual down to near the inner end of the bit where it merges into the flat inner end face of the bit.

We claim:

1. A saw assembly comprising a body member having a main recess and a subsidiary recess at the rear of the main recess and communicating therewith, said subsidiary recess having an edge defining the same in the form of a continuous curve merging into a flat shoulder at its inner end, the said edge being of V-shape, and being free from undercut at the lower part thereof, and formed as an unbroken continuation of the upper part, said V-shape formation extending substantially all the way to said shoulder, and a tooth insertable into said subsidiary recess having a comparatively narrow lower end, and grooved to fit the beveled edge of the saw body, said groove extending to the lower bearing face of said tooth, which face is adapted to rest on said shoulder, substantially as described.

2. A saw assembly according to claim 1 in which said V-shaped edge is gradually reduced in height adjacent and merging into said shoulder.

WILLIAM EMERY MINER.
JAMES STERLIN MINER.